United States Patent Office 3,297,459
Patented Jan. 10, 1967

3,297,459
PROCESS OF PREPARING FORMED
COLLAGEN BODIES
Arthur Veis, Skokie, and Jerome Cohen, Chicago, Ill., assignors to Armour and Company, Chicago, Ill., a corporation of Delaware
No Drawing. Filed Apr. 8, 1965, Ser. No. 446,718
7 Claims. (Cl. 106—161)

This application is a continuation-in-part of our copending application Serial No. 56,646, filed September 19, 1960, now Patent 3,178,301. Reference is also made to our copending application Serial No. 141,956, filed October 2, 1961, now abandoned.

This invention relates to a process of preparing formed collagen bodies, and more particularly to a process for preparing cross-linked collagen bodies of high strength. The process is particularly applicable to the preparation of collagen sheets, filaments, molded bodies, and the like which are formed primarily from native collagen fibers while using solubilized reconstitutable collagen as a binder.

Native fibrous collagen can be partially or completely converted to solubilized collagen by heating the collagen fibers at controlled temperatures in water at acidic or neutral pH conditions. Our application Serial No. 56,646 describes a method of preparing solubilized collagen by heating the fibrous collagen in contact with water containing an organic hydroxylated acid such as citric acid, lactic acid, etc. While it is preferred to employ that process to prepare the aqueous solution of solubilized reconstitutable collagen for use in the process of this application, other process and procedures can be used. For example, the solubilized reconstitutable collagen can be prepared by one or more of the processes described in United States Patents 3,075,961, 2,838,363, 3,110,549, 3,126,433, 2,934,446, and 2,934,447.

Solubilized collagen prepared by any of the above procedures can be used as a binder for native fibrous collagen in the process of this application. For example, a pulp or slurry can be formed by dispersing a minor proportion of solubilized collagen in a larger body of native collagen, or native collagen can be partially extracted to produce the starting material. The native collagen is finely-divided and is preferably in the form of discrete fibers or fibrils. The proportions of solubilized collagen can vary widely. For example, from 5 to 30% by weight of the collagen in the mix can be in the form of solubilized collagen with the rest in the form of finely-divided native collagen material. Where the collagen has been solubilized to a greater extent than desirable in the extraction step, additional collagen fibers can be added to produce a mix of the desired consistency and content of fibrous collagen. The solubilized collagen should be dispersed throughout the fibrous collagen and in intimate association therewith, and the mix should be flowable. The mix or slurry is then formed to the desired shape, such as by an extrusion process. For example, sheets and filaments of uniform dimensions can be readily formed in this way. The formed sheets can be flat, curved, tubular, etc.

Collagenous materials from various sources are suitable starting materials to produce the products of this invention. Examples of such materials include hides, skins, tendons, ossein and so on. Preferably mature steer hide or hide scraps are used as raw material. We may use collagen which has been subjected to various pretreatments such as dehydration, salting and the like, but it is preferable to employ fresh or unlimed collagenous stock. Optimally, the fresh collagenous stock is dehaired, fleshed and thoroughly cleaned and washed prior to processing.

In preparing the starting material or mix for practicing this invention the collagen can be mechanically subdivided by a variety of well-known methods, such as beating, grinding or comminuting. One satisfactory method of accomplishing this procedure is to introduce the collagen into a paper beating machine with sufficient water and with sufficient mixing and beating to form a free-flowing slurry. A preferred type of apparatus is the Hollander type paper beater which yields a satisfactory slurry without appreciably reducing the length of the native fibers.

Following mechanical sub-division the disaggregated collagen slurry in one preferred procedure can then be solubilized with an aqueous acidic solution. For example, hydroxylated organic acids produce the dissolved precipitatable collagen which is important in this invention, as described more fully in the cited application Serial No. 56,646. Although we prefer to employ citric acid or lactic acid in the process, examples of other acids which may be used include benzilic, glycolic, glycerolphosphoric, hydroxybutyric, and the like. Acids of this type are believed to react with the collagen fibers during heating and solubilization thereby preventing protein reaction with water present, as a consequence of which the collagen fiber fragments cannot collapse. The dissolved fibers thus remain susceptible to reprecipitation in a native cross-linked polymeric pattern.

A pH of about 2.5 to 4.0 in the collagen-acid solution reaction mixture is usually advantageous. More generally, about 0.01 molar to 1 molar acid solutions can be used, depending on the individual acid or acid mixture utilized.

Throughout the solubilizing portion of our process, it is most important that temperature of the reaction mixture be maintained between about room temperature (e.g. 20–25° C.) and 70° C. Best results are usually experienced when a temperature of between about 30° C. and 60° C. is used. However, depending on the acid concentration and the time of extraction, temperatures as low as 0 to 5° C. can be used to produce solubilized reconstitutable collagen as described more fully in the cited Patents 2,838,363, 2,934,446 and 2,934,-447. Usually, the extraction or solubilization should be continued until at least 5% by weight of the collagen is solubilized, especially if more native collagen material is to be added to form the mix. The mix or slurry which forms the starting material for the process of the present invention may contain as little as 1 to 2% of solubilized collagen based on the total collagen therein, but preferably contains a higher percentage as previously indicated. The consistency of the flowable mix can vary from a thick paste to a thin slurry, since excess water can be removed at a later stage.

In one procedure mix may be formed as desired, such as by extrusion, and allowed to remain in a cool place for a short time, but there is nothing critical about this procedure. The forms, such as sheets, may then be re-aggregated into stable cross-linked structures by any of several methods which reprecipitate the solubilized collagen fraction. Good results are obtained by a combination of neutralization and salting. This is easily accomplished by placing the fiber structure in half saturated ammonium sulphate made basic with ammonium hydroxide. The resulting wet skin-like structure may be further processed as typical native collagen. The reconstituted fibers which are produced as described above have the following properties. The fibers when viewed by means of an electron microscope exhibit the typical cross striations of native collagen, having an axial periodicity of about 600 to 650 A. The materials containing the tropocollagen-like fibers of our invention consist of interwoven networks of fibers, exhibit reversible syneresis, if subjected to orienting stress, dissolve in water at pH's of about 1 to 3 and are substantially insoluble in water at pH's of about 4 to 8. In addition these materials have relatively high wet tensile strength.

Turning now to a more detailed discussion of the process of this invention, the formed collagen which contains the solubilized collagen in intimate association with the fibers of native collagen is brought into contact with an aqueous solution of ammonium sulfate. The concentration of ammonium sulfate in the aqeous solution is of importance in accomplishing the objects of the present invention. In general, the concentration should be sufficient to cause the solublized collagen to reconsitute to fibrous collagen having the cross-striations of native collagen. It is preferred to have the concentration equivalent to not less than 0.2 saturation at 20° C. Saturated solutions can be used, but are not as desirable as partially saturated solutions. The best operating range corresponds to a concentration of ammonium sulfate in the aqueous solution of 0.3 to 0.8 saturation at 20° C.

The formed collagen can be contacted with the ammonium sulfate solution in various ways. For example, the collagen sheet, filament, or other formed or extruded shape can be passed into or through a bath of the ammonium sulfate solution. Even a very short time of contact with the ammonium sulfate solution will increase the strength of the formed collagen, and a maximum increase in strength can be obtained in a relatively short time. For example, immersion of the collagen sheet or filament in the ammonium sulfate bath for from 5 to 20 minutes will usually be sufficient. For collagen sheets of about ⅛ inch thickness, a 15 minute contact time was found to be sufficient for maximum strength. Where it is desired to obtain more rapid penetration of the ammonium sulfate solution into the collagen sheet or filament, a needling procedure can be used wherein hollow needles are pressed into the collagen body and the ammonium sulfate solution injected into the body through the needles. After the injection of the solution, the distribution of the solution within the body can be promoted by passing the collagen sheet or filament between squeeze rolls, or by manipulating the formed collagen in other ways.

The strengthening step described above can be readily integrated in processing operations. For example, the collagen sheet or filament can be formed continuously by an extrusion process, passed over chilling rolls to set the material, and then through the ammonium sulfate solution. The chilling of the formed collagen before treatment with the ammonium sulfate solution is not essential, and the chilling step can be omitted or performed subsequent to the ammonium sulfate solution treatment.

Following the treatment with the ammonium sulfate solution, the formed collagen can be subjected to other treatments such as standard tanning procedures, depending on the end use of the product. For example, chrome tanning reagents can be used. For achieving rapid penetration of the collagen sheets and faster fixation of the chrome, it is desirable to employ a chrome tanning reagent containing sodium formate in addition to chromic oxide. For example, an aqueous solution containing 1% chromic oxide and 2% sodium formate is particularly suitable. Any ammonium sulfate remaining within the collagen is compatible with the tanning procedure and does not interfere with it. It is desirable, however, to remove the excess ammonium sulfate solution, and if desired, the outer surfaces of the sheet or filament can be washed with water to remove any salts from the outer surfaces.

The treatment of the formed collagen with the ammonium sulfate solution is preferably carried out at a substantially neutral pH. Acid pH's below 5.0 tend to cause the collagen fibers to swell, and it is difficult to produce collagen sheets of maximum strength while pH's above 5.5 are preferred to assure that the collagen fibers are not unduly swollen. In reference to these pH's a distinction should be made between the pH of the ammonium sulfate solution and the internal pH of the formed collagen sheet or filament. Where the collagen employed as a binder has been solubilized by an acid extraction procedure, the internal pH of the formed collagen body prior to the ammonium sulfate treatment will normally be substantially below pH 5.0. It may therefore be desirable to substantially neutralize the acid within the sheet prior to or during the ammonium sulfate treatment. This can easily be accomplished by incorporating a base in the ammonium sulfate solution. Ammonium hydroxide is a particularly desirable base when working with partially saturated solutions of ammonium sulfate. Sufficient ammonium hydroxide can be incorporated in the solution to neutralize the acid without causing the precipitation of salts within the formed collagen body. Also, the ammonium hydroxide and any salts resulting therefrom are compatible with subsequent chrome tanning of the formed collagen.

Where a base is incorporated in the ammonium sulfate solution, and the formed collagen has an internal pH below 5.0 prior to the ammonium sulfate treatment, the pH of the bath can be somewhat higher than would otherwise be desirable. For example, the pH of the bath may be as high as 9.0. It will be understood that the pH of the bath should result in a substantially neutral internal pH. For example, the solution pH may range from 5.5 to 8.0, and result in an internal pH of the formed collagen of from 5.5 to 7.5. More generally, the solution pH should be above 5.0 but preferably not substantially above 9.0. If the solution is too strongly basic, this may tend to interfere with the subsequent tanning of the formed collagen. Where this is not a problem, however, more baisc pH's can be used while still obtaining an increase in strength of the collagen material.

The temperature employed in the ammonium sulfate treating step is not particularly critical. For example, temperatures ranging from 0 to 20° C. are suitable. It is desirable to avoid temperatures which are so slow as to cause the formation of ice crystals within the treating solution or within the formed collagen. Temperatures higher than 20° C. can be used, but the lower temperatures are most desirable, especially when the formed collagen has been subjected to a chilling step before being treated with the ammonium sulfate solution.

This invention is further illustrated by the following specific examples.

EXAMPLE 1

1200 gms. of fresh steer hide corium were beaten in a paper beater with added water. The beaten collagen slurry was dewatered by wringing out the fibers between rubber rollers to give wet fibers containing 25% protein and 75% water. 1200 gms. of the wet fibers were added to 1800 cc. of 0.1 M citric acid solution. The reaction mixture which had a pH of 3.5, was maintained at a temperature of 50° C. for 30 minutes while being continuously mixed in a screw-type blender. 450 gms. of the acid treated fiber dough were added to 940 gms. of wet fibers, which had been de-watered, and the mixture was lightly tanned in 3% formaldehyde solution for a short period of time. To the lightly tanned wet fibers was added 450 gms. of fiber dough and 1505 cc. of water. The fiber and water mixture were blended for 30 minutes and rolled into sheets having a thickness of about .016 inch.

The sheet was placed in a cold room at about 4° C. for 30 minutes, after which it was immersed in half saturated ammonium sulfate which had been adjusted to pH 8.1 by the addition of ammonium hydroxide. The ammonium sulfate solution was prepared by adding 1100 ccs. of water to one pound of ammonium sulfate. After four hours immersion, the sheets were water-washed and chrome tanned to produce a high strength leather-like product.

EXAMPLE 2

Bovine corium collagen pieces of about 1 cm. cubed were suspended in 0.1 M citric acid at room temperature. After the collagen pieces were wet through with citric acid solution, the mixture was heated with stirring to 50° C. for one hour. The majority of the material dissolved, leaving a few pieces of individual fibers remaining. The entire slurry was blended in a Waring blendor to obtain uniform dispersion. This slurry was then extruded through an orifice onto a moving belt which carried the formed sheet through a one-half saturated solution of ammonium sulfate. pH of the bath was maintained at 8.5 with ammonium hydroxide. Extruded fibers were carried through several feet of the bath and then picked up on a second conveyor belt and transferred to a bath of cold water maintained at low ionic strength. As soon as salt was removed, fibers were picked out of the water wash and transferred to a drying tower.

EXAMPLE 3

Beef corium which had been cleaned and cubed was suspended in 0.1 M glycolic acid at room temperature. The acidified collagen was heated to 55° C. with constant agitation and held for one hour at that temperature. The collagenous mix was centrifuged and the supernatant collected. This supernatant was poured into a pan and chilled at 4° C. for thirty minutes, after which a one-half saturated solution of ammonium sulfate adjusted to pH 8.1 with ammonium hydroxide was layered onto the resulting chilled collagen gel. After one hour at room temperature the resulting sheet was dialyzed against tap water to remove ammonium sulfate. A high wet strength sheet suitable for tanning resulted.

EXAMPLE 4

The starting material was native collagen fibers which had been prepared from the corium layer of fresh unlimed cattle skins by mechanically subidividing the corium into discrete fibers by means of a paper beater. The corium was treated in an aqueous slurry in the beater, and the resulting fibers were subsequently dewatered and dried to provide the starting material. In the experiment, 60 grams of the collagen fibers were dispersed in 240 cc. of water. The pH was 6.0 and the solids concentration was 20%. The temperature of the water was raised to 50° C. before the fiber was metered in. Heating was continued until a maximum of 60° was reached at which time blending was started. Blending was continued during the entire heating period of one hour. At the conclusion of the heating, the doughy pulp was formed into a sheet by a hand rolling procedure. The sheet was cold set at 4° C. for ten minutes, and then immersed in a bath of half saturated ammonium sulfate (pH 6.0). After one hour the sheet was examined and found to be exceedingly strong. The sheet was then tanned according to standard procedures, using a chrome tanning reagent.

EXAMPLE 5

The starting material was native collagen fibers which had been prepared from the corium layer of fresh unlimed cattle skins by mechanically subidividing the corium into discrete fibers by means of a paper beater. The corium was treated in an aqueous slurry in the beater, and the resulting fibers were subsequently dewatered and dried to provide the starting material. In the experiment, the dried fiber was dispersed in 0.25% benzoic acid at 50° C. for 15 minutes, while stirring vigorously and keeping the solids content at approximately 20%. After mixing, collagen sheets were rolled to a thickness of 6 mm. while the temperature was maintained at 50° C. The sheets were transported to the cold room (4° C.) and remained there for 30 minutes, after which they were precipitated in a SAT./2 $(NH_4)_2SO_4$ bath that was adjusted to pH 8.1 with $NH_4OH$. After precipitation and reconstitution was complete (about 1 hour) the sheets were washed in running tap water. A strip was removed and tested for thermal shrinkage in a Theis shrink meter, but broke at 62° C. After washing for 2 hours the sheets were exposed to an aqueous chrome tanning solution (1% $Cr_2O_3$+2% NaCOOH). At regular intervals strips of collagen were removed from the tanning bath and shrinkage measurements made. These results are tabulated below.

*Effect of chrome uptake on shrinkage temperature*

| Exposure in hours: | $T_s$, ° C. |
|---|---|
| 1 | 72.5 |
| 2 | 78.5 |
| 3 | 80.0 |

Exhaustive washing of the sheet before tanning, did not effect the chrome uptake or shrinkage temperature significantly. The salt that is formed during neutralization in the sheets apparently acts as a de-swelling agent during the tanning. The shrinkage temperature can be raised if the collagen is removed from the tanning bath and covered to prevent surface drying. This enhances fixation of the chromium and subsequently will raise the shrinkage temperature.

While in the foregoing specification this invention has been described in relation to a preferred embodiment thereof and many details have been set forth for purpose of illustration, it will be apparent to those skilled in the art that the invention is susceptible to other embodiments and that many of the details set forth herein can be varied.

We claim:
1. The process of preparing formed collagen bodies from a flowable mixture of finely-divided native collagen material and reconstitutable collagen solubilized in an aqueous solution, comprising the steps of:
    (a) forming said mixture into a body of the desired shape; and
    (b) contacting said formed body with an aqueous solution of ammonium sulfate having a pH above 5.5 up to about 9.0, while said solubilized collagen remains in intimate association with the native collagen material of said body,
        the ammonium sulfate concentration of said solution being sufficient to cause said solubilized collagen to reconstitute to fibrous collagen having the cross-striations of native collagen;
whereby a cross-linked collagen body of high strength is obtained.

2. The process of claim 1 wherein said body is in sheet form.

3. The process of claim 1 wherein said body is in filament form.

4. The process of claim 1 wherein said ammonium sulfate solution has an ammonium sulfate concentration corresponding to not less than 0.2 saturation at 20° C.

5. The process of preparing formed collagen bodies from a flowable mixture of finely-divided native collagen material and reconstitutable collagen solubilized in an aqueous solution, comprising the steps of:
    (a) forming said mixture into a body of the desired shape; and (b) contacting said formed body with an aqueous solution of ammonium sulfate having a pH above 5.5 up to about 9.0, while said solubilized collagen remains in intimate association with the native collagen material of said body, said ammonium sulfate solution being free of collagen-tanning agents and having an ammonium sulfate concentration corresponding to 0.3 to 0.8 saturation at 20° C.;

whereby an untanned cross-linked collagen body of high strength is obtained.

6. The process of claim 5 wherein said body is in sheet form.

7. The process of claim 5 wherein said body is in filament form.

References Cited by the Examiner
UNITED STATES PATENTS

| | | | |
|---|---|---|---|
| 3,071,483 | 1/1963 | Tu | 106—155 |
| 3,178,301 | 4/1963 | Veis et al. | 106—124 |

MORRIS LIEBMAN, *Primary Examiner.*

ALEXANDER H. BRODMERKEL, *Examiner.*

D. J. ARNOLD, *Assistant Examiner.*